April 16, 1935. R. BOOTH 1,998,415
VEHICLE WHEEL
Filed July 11, 1933
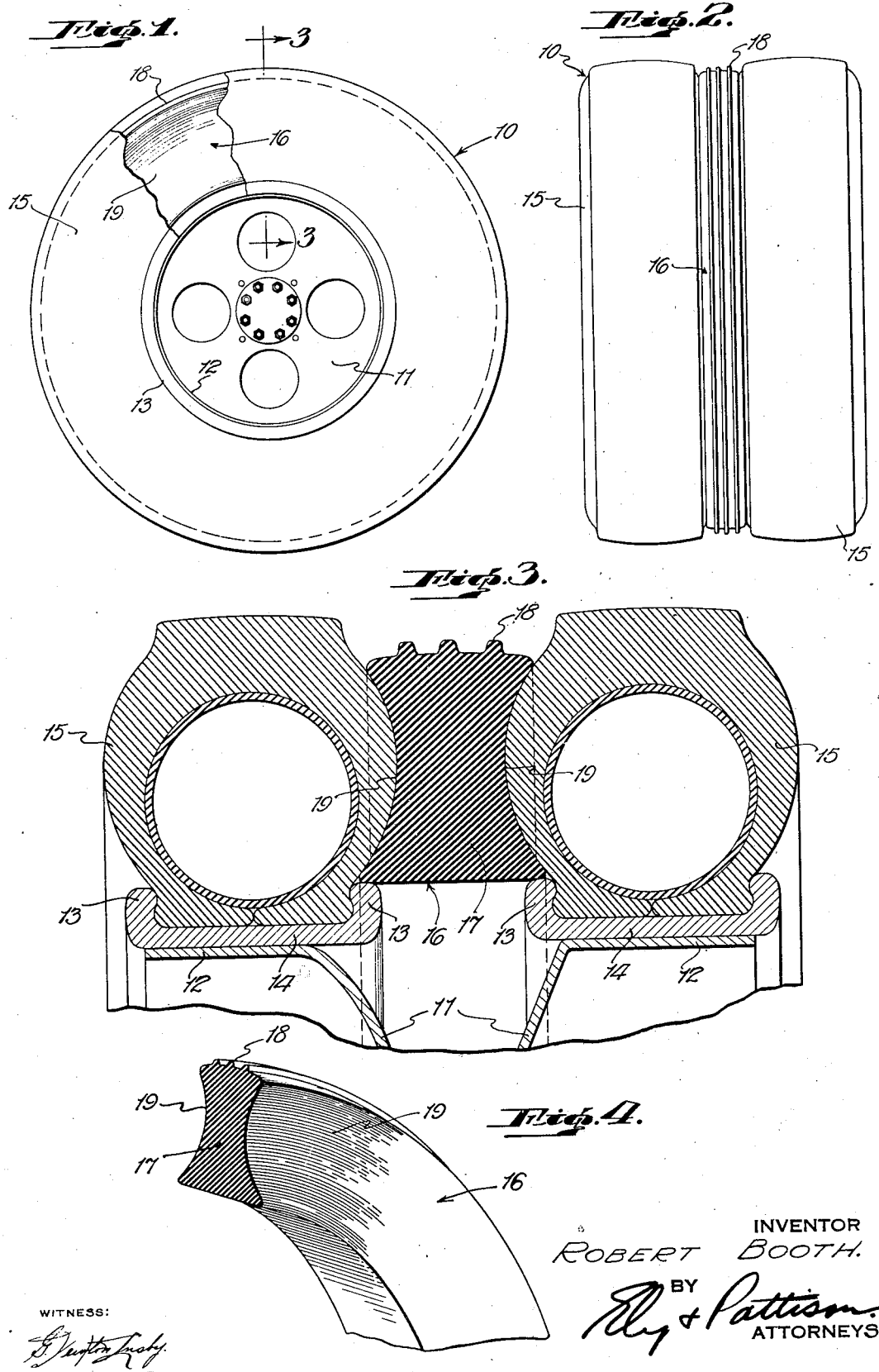
INVENTOR
ROBERT BOOTH.
BY
Ely & Pattison
ATTORNEYS
WITNESS:

Patented Apr. 16, 1935

1,998,415

UNITED STATES PATENT OFFICE 1,998,415

VEHICLE WHEEL

Robert Booth, Dover, N. J., assignor to Robert Booth & Company, Dover, N. J.

Application July 11, 1933, Serial No. 679,840

1 Claim. (Cl. 152—10)

This invention relates to vehicle wheels of the double tire type for use upon trucks, buses and like motor vehicles.

In the construction of double tired wheels, the inner sides of the tires are spaced apart, and it is not uncommon for stones and other like articles to become stuck or wedged therebetween. In instances where the tires are of the pneumatic type, such lodging of stones therebetween causes the inner walls of the tires to become bruised or cut, resulting in the weakening of the tire structure and often punctures and blow outs of the tires may be attributed to this condition. It is therefore one of the main objects of this invention to prevent the accumulation of such foreign objects between the spaced tires and to strengthen the inner adjacent walls of the same.

Another object of the invention resides in a yieldable filler tire or ring which is held in position by and between the pneumatic tires to fill the space therebetween, the same having its outer periphery or tread normally disposed inwardly of the treads of the pneumatic tires, but which serves to increase the tread surface of the wheel when the pneumatic tires are under-inflated to relieve the load upon the pneumatic tires and improve their tractive qualities.

A further object of the invention is the provision of an auxiliary filler tire for multiple tire wheels which may be installed upon the present construction of wheel without alterations in the construction thereof.

With these and other objects in view, the invention resides in the certain novel construction, combination and arrangement of parts, the essential features of which are hereinafter fully described, are particularly pointed out in the appended claim, and are illustrated in the accompanying drawing, in which:

Figure 1 is a side elevational view of a multiple tire wheel with a part broken away showing the invention associated therewith.

Figure 2 is an edge elevational view.

Figure 3 is an enlarged vertical transverse sectional view on the line 3—3 of Figure 1.

Figure 4 is a sectional perspective view of the auxiliary filler tire per se.

Referring to the drawing by reference characters, the numeral 10 designates a double tired wheel of the conventional construction and in this instance a wheel of the disk type has been shown. The wheel 10 comprises disks 11 flared outwardly and formed with fellies 12 disposed in spaced relation and on which the rims 13 are mounted and which rims are of the clincher type and are provided with beads 14 for securing the pneumatic tires 15 in position upon the rim. The pneumatic tires 15 are disposed in spaced relation as clearly shown in Figure 3 of the drawing, and as set forth in the objects of the invention, it is not uncommon for stones and other foreign objects to become wedged or stuck between the inner walls of the pneumatic tires 15. My invention aims to close the space between the pneumatic tires and provide an auxiliary tire for the pneumatic tires when they are under-inflated.

Interposed between the adjacent inner walls of the pneumatic tires 15 is the auxiliary filler tire 16 which comprises a resilient body 17 preferably constructed of rubber, the outer periphery of the said body having a tread surface 18, while the opposite sides of the body are concaved as at 19 so as to substantially correspond with the shape of the inner walls of the pneumatic tires with which opposite sides of the auxiliary filler tire abuts.

In positioning the auxiliary filler tire between the two pneumatic tires, it is necessary to remove the outer pneumatic tire and its rim whereupon the auxiliary filler tire 16 may be placed against the outer side wall of the inner pneumatic tire with the inner periphery of the auxiliary tire resting upon a bead 14 of the inner rim. This positions the tread 18 of the auxiliary filler tire inwardly of the plane of the tread of the pneumatic tire so that when the pneumatic tires are fully inflated, the auxiliary tire is out of contact with the road surface. After so positioning the auxiliary filler tire, the outer pneumatic tire and its rim are inserted upon the outer felly, and normally the thickness of the auxiliary tire is slightly greater than the space between the pneumatic tires which is adapted to close, thus when the outer tire is replaced upon its felly 12, the auxiliary tire will be slightly compressed in opposite directions and will be securely held in position against circumferential movement relative to the pneumatic tires. When the parts are fully assembled as shown in Figure 3, the inner periphery of the auxiliary filler tire rests upon the inner beads 14 of the respective rims 12. By this construction, it will be seen that the space between the two pneumatic tires is closed and the filler tire serves to prevent the accumulation of foreign objects between the walls of the two pneumatic tires.

In the event that the pneumatic tire should become partially deflated, the tread surface 18 of the auxiliary filler tire will contact with the surface of the road and increase the traction qualities of the wheel.

During the travel of the wheel over uneven surfaces, the pneumatic tires are free to distend due to the shock as the auxiliary filler tire is of a resilient or yieldable material. In such cases, the auxiliary filler tire serves to equalize the road shocks imparted to the pneumatic tires and aids in the cushioning of such shocks.

While I have shown and described what I deem to be the most desirable embodiments of my invention, I wish it to be understood that such changes as come within the scope of the appended claim may be resorted to if desired.

Having thus described the invention, what I claim as new and desire to secure by Letters Patent of the United States, is:—

In a dual vehicle wheel including a pair of spaced fellies having clincher type rims fitted thereon and pneumatic tires mounted on said rims, the inner flanges of said clincher type rims and the inner sides of said tires being respectively spaced from each other, a resilient rubber filler ring member having concavities in opposite sides thereof to conform substantially to the exterior of the side walls of said tires and being of a normal width greater than the width of the space between said tires, said ring member being interposed between the inner sides of said tires and compressed by the expansion of said pneumatic tires when under normal air pressure, the outer periphery of said filler ring member being inwardly of the plane of the tread surface of said tires when inflated while the inner periphery of said filler ring member rests upon the inner flanges of said rims and is free to distend radially inwardly within the space therebetween.

ROBERT BOOTH.